(12) United States Patent
Aljhdali (10) Patent No.: US 9,774,814 B1
(45) Date of Patent: Sep. 26, 2017

(54) DISPLAY DEVICE CONTROL SYSTEM (71) Applicant: Mohammed Tawfiq Aljhdali, Westbury, NY (US)

(72) Inventor: Mohammed Tawfiq Aljhdali, Westbury, NY (US)

( * ) Notice: Subject to any disclaimer, the term of this patent is extended or adjusted under 35 U.S.C. 154(b) by 0 days.

(21) Appl. No.: 15/180,917

(22) Filed: Jun. 13, 2016

(51) Int. Cl.
*H04N 5/63* (2006.01)
*H04N 5/225* (2006.01)
*G06F 3/147* (2006.01)
*G06F 3/16* (2006.01)
*G06K 9/00* (2006.01)

(52) U.S. Cl.
CPC .............. *H04N 5/63* (2013.01); *G06F 3/147* (2013.01); *G06F 3/16* (2013.01); *G06K 9/00335* (2013.01); *H04N 5/225* (2013.01)

(58) Field of Classification Search
CPC H04N 5/63; H04N 5/44; H04N 5/225; H04N 7/17309; G06F 3/147; G06F 3/16; G06K 9/00335
USPC .... 348/730, 553, 155, 162–164; 725/12, 11, 725/10, 110, 136, 114, 121
See application file for complete search history.

(56) References Cited

U.S. PATENT DOCUMENTS

| 5,408,276 | A | | 4/1995 | Morales | |
|---|---|---|---|---|---|
| 5,521,652 | A | | 5/1996 | Shalvi | |
| 5,541,664 | A | * | 7/1996 | Cuadrado | H04N 5/44 |
| | | | | | 348/553 |
| 6,259,486 | B1 | * | 7/2001 | Mahvi | H04N 5/44 |
| | | | | | 348/553 |
| 6,889,382 | B1 | * | 5/2005 | Anderson | H04N 7/17309 |
| | | | | | 348/155 |
| 6,894,609 | B2 | * | 5/2005 | Menard | G08B 25/008 |
| | | | | | 340/3.1 |
| 7,761,555 | B1 | * | 7/2010 | Bishel | H04L 12/2814 |
| | | | | | 340/12.39 |
| 2009/0073313 | A1 | | 3/2009 | Lui | |
| 2014/0267097 | A1 | | 9/2014 | Lee et al. | |
| 2015/0201236 | A1 | | 7/2015 | Al Remeithi | |

OTHER PUBLICATIONS

Sony, "Intelligent presence sensor", http://www.sony.net/Fun/desion/activity/product/ip_sensor/03.html, 2016, pp. 1-4.
Sony, "Presence Sensor", http://docs.esupport.sony.com/referencebook/en/ve5/pages/funfeatures/presencesensor.html, 2009, pp. 1-2.

* cited by examiner

*Primary Examiner* — Trang U Tran
(74) *Attorney, Agent, or Firm* — Oblon, McClelland, Maier & Neustadt, L.L.P.

(57) ABSTRACT

A system for controlling a display device, includes a display control device, an electrical switch connected to an electrical power source, and a motion sensor connected to the display control device. In a case where the motion sensor senses a motion, the motion sensor provides the sensed motion as an input to the display control device, and the display control device, in turn, controls the electrical switch and controls a supply of power to the display device. Further, the system includes a signal source, the signal source having at least an audio or video signal, and a switchbox connected to the display control device. The display control device operates the switchbox to control a transmission of at least one of the audio and video signals from the signal source received by the display device.

7 Claims, 6 Drawing Sheets

DISPLAY DEVICE CONTROL SYSTEM

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

Field of the Disclosure

The present disclosure is directed toward a system and method for controlling a display screen based on viewer actions.

Description of the Related Art

Proliferation of display screens in consumer electronics has led to an increased risk of eye strain and other vision-related conditions for some viewers, particularly those who often view display screens for extended periods of time and in ways that are generally non-optimal.

Further, while viewers themselves may not be aware of the potential risks associated with frequent use of display screens, other concerned parties may have an interest in the need to monitor appropriate usage of display screens.

For these reasons it is important that improved methods and systems for protecting viewers against potentially harmful effects of non-optimal use of display screens be developed, particularly with the aim of reducing the frequency and severity of eye strain and other vison-related conditions.

SUMMARY

The present disclosure is directed to a system for controlling a display device, having a display control device, an electrical switch connected to an electrical power source, and at least one power cable. The power cable is connected at one end to the display device and at the other end to the electrical switch. The system further includes a motion sensor connected to the display control device, with the motion sensor sensing motion and providing an input to the display control device. Further, the display control device controls the electrical switch and controls a supply of power to the display device.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

In the drawings, like reference numerals designate identical or corresponding parts throughout the several views. Further, as used herein, the words "a", "an" and the like generally carry a meaning of "one or more", unless stated otherwise.

Referring now to the drawings, wherein like reference numerals designate identical or corresponding parts throughout the several views.

Figure 1:
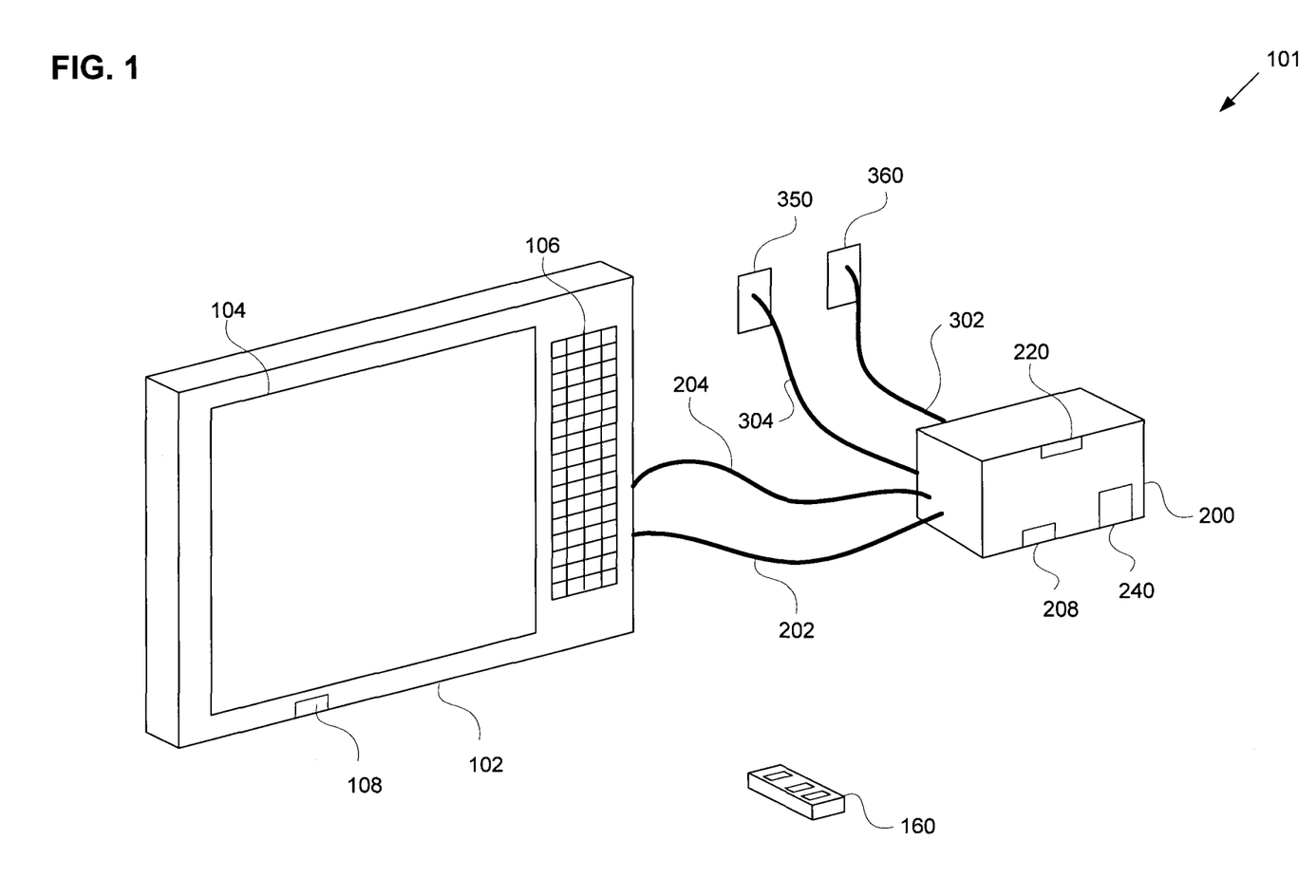
FIG. 1 is a diagram of a display device control system, according to one example.

FIG. 1 is a diagram of a display device control system 101, according to one example. The display device control system 101 includes a display control device 200 connected to a display device 102 by a first power cable 202 and a first signal cable bundle 204. The display control device 200 is also connected to a signal source 350 and an electrical power source 360 by a second signal cable bundle 304 and a second power cable 302, respectively.

The display device 102 includes a display screen 104, an audio device 106, and a motion sensor 108. The display screen 104 is, for example, a television screen, a monitor, or a projector, that displays still images and videos. The audio device 106 is, for example, a speaker, amplifier, or megaphone that produces a sound output. The display device 102 may further include a remote display device controller 160 that allows control of the display device 102 from a distance. In one example, the remote display device controller 160 is wireless and operates using infrared (IR) signals.

The display control device 200 includes a motion sensor 208 and a controller 240, and, optionally, a camera 220. The second power cable 302 supplies electrical power from the electrical power source 360 to the display control device 200, and the display control device 200, in turn, supplies electrical power to the display device 102 through the first power cable 202. The first power cable 202 and the second power cable 302 are connected within the display control device 200. The signal source 350 supplies video and audio signals to the display control device 200 through the second signal cable bundle 304, and the display control device 200 supplies video and audio signals to the display device 102 through the first signal cable bundle 204. The signal source 350 may be a satellite dish, a wired Internet connection, or a wireless device connected to an external network such as by Wi-Fi or cellular signal. The first signal cable bundle 204 and the second signal cable bundle 304 are also be connected within the display control device 200. The operation of the display control device 200 is controlled by the controller 240, as is operation of the motion sensor 208 and the camera 220. The motion sensor 108 senses motion and transmits detection signals to the controller 240 through either a wired or wireless connection.

In another example, the camera 220 is a separate and standalone device from the display control device 200 and is located in a different plane from that of the display control device. For example, the camera 220 is located at a different elevation or mounted on a wall, a floor, a ceiling, or another surface to provide a desired position for the operation of the display control device 200. Further, there may be a plurality of cameras 220, for example, a second or a third camera 220 to provide additional visibility. The visual areas of the various additional cameras 220 do not have to be contiguous. Each camera 220 may be connected to the controller 240 of the display control device 200 by a wired or wireless connection, for example by a WiFi or a cellular connection, or through an external network.

Figure 2:
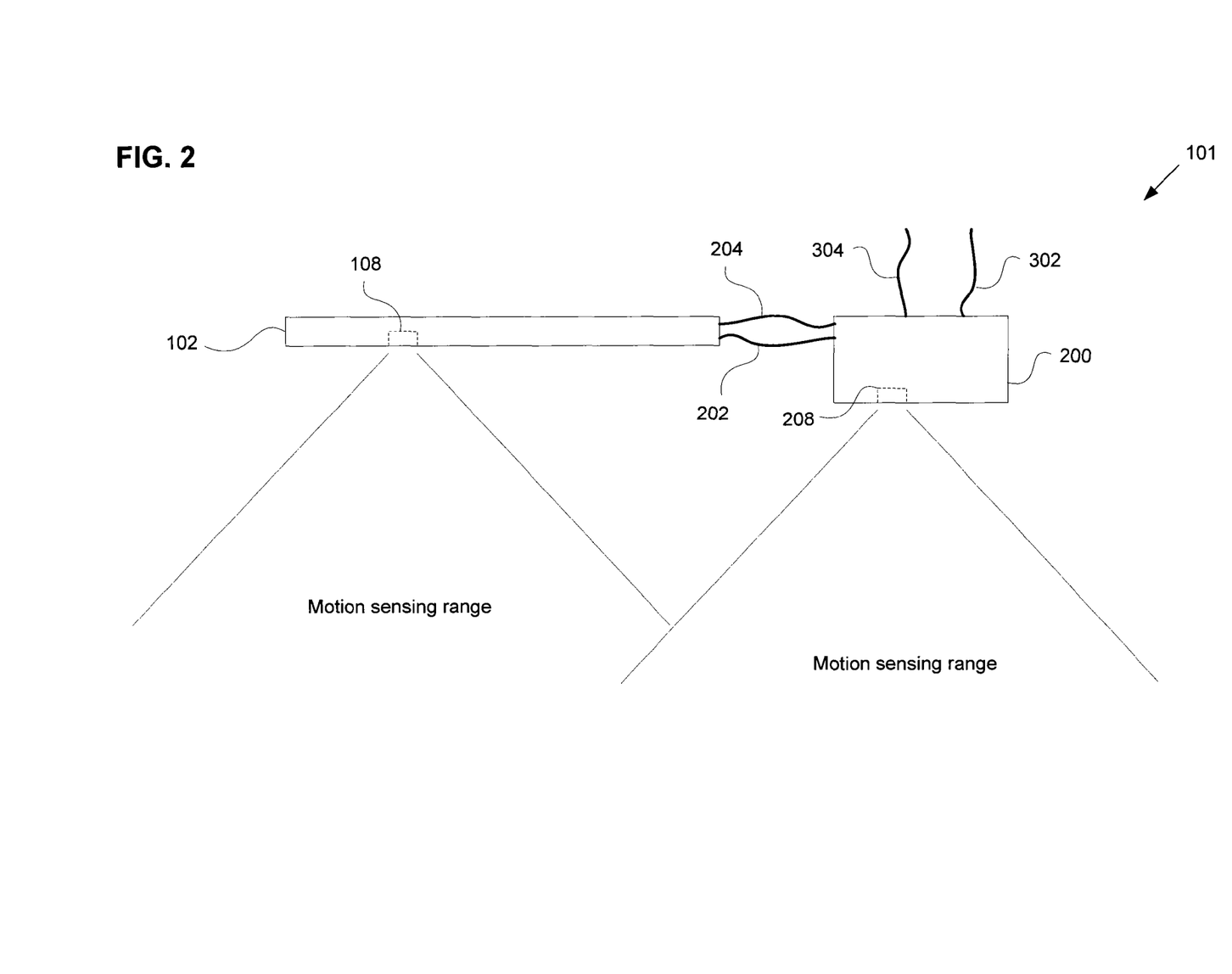
FIG. 2 is a diagram of the display device control system in a plan view, according to one example.

FIG. 2 is a diagram of the display device control system 101 in a plan view, according to one example. The motion sensor 108 of the display device 102, for example, includes a photo sensor, a radar, an ultrasonic device, an infrared device, or a camera, senses motion, such as that of a human body, by up to a distance of about 20 feet from the motion sensor 108. The motion sensor 108 includes a motion sensing range, for example, up to 360 degrees depending on the type and the disposition of the motion sensor 108. The motion sensor 208 of the display control device 200 may be identical to the motion sensor 108 of the display device 102. The motion sensor 108 and the motion sensor 208 may be disposed along a substantially linear direction, or the motion sensor 108 may be disposed at an angle, with respect to the motion sensor 208 in this view, providing a different cumulative sensing area. In another example, at least one of the motion sensor 108 and the motion sensor 208 may be separate from the display device 102 and the display control device 200, respectively.

In another example, at least one of the motion sensor 108 and the motion sensor 208 may be separate from and standalone to the display device 102 and the display control device 200, respectively, and may be disposed in different planes from those of the display device 102 and the display control device 200. For example, at least one of the motion sensor 108 and the motion sensor 208 is located at a different elevation or mounted on a wall, a floor, a ceiling, or another surface in order to provide the desired motion sensing ranges for the operation of the display control device 200. Further, there may be a plurality of motion sensors 208, for example, a first motion sensor 208a, a second motion sensor 208b, or a third motion sensor 208c for providing motion sensing capability over additional sensing ranges or in additional sensing areas. Additional sensing ranges and areas of the various motion sensors 208 do not necessarily have to be contiguous with the ranges or areas of the motion sensor 108 or the motion sensor 208. Each motion sensor 108 and additional motion sensor 208 may be connected to the controller 240 of the display control device 200 by a wired or wireless connection, for example by a WiFi or a cellular connection, or through an external network.

Figure 3A:
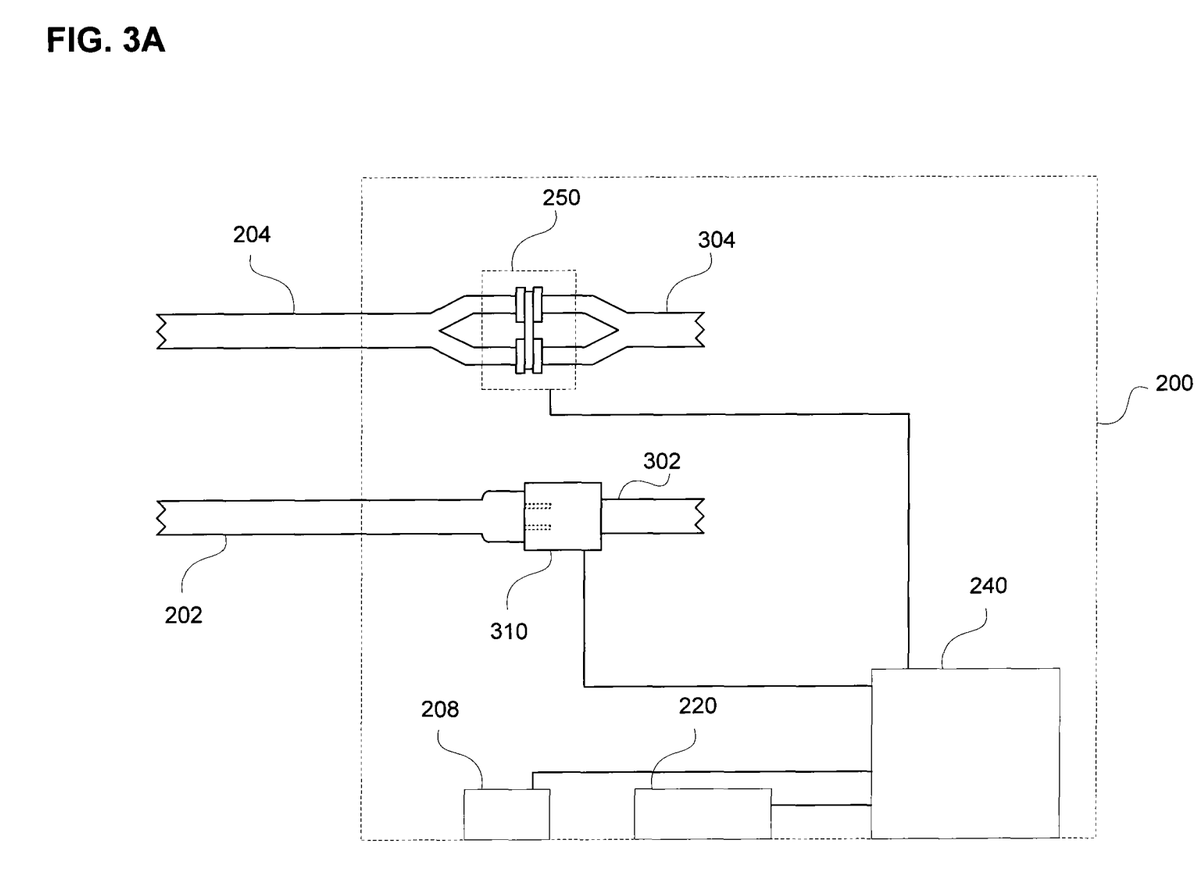
FIG. 3A is a diagram of a display control device, according to one example.

FIG. 3A is a diagram of the various components of the display control device 200, according to one example. The display control device 200 includes the motion sensor 208, the camera 220, the controller 240, a switch box 250, and an electrical switch 310. The controller 240 may be connected to and in control of each of the motion sensor 208, the camera 220, the switch box 250, and the electrical switch 310.

A first end of the first power cable 202 and a first end of the first signal cable bundle 204 may each be connected to the display device 102 (not shown), while a second end of the first power cable 202 may be connected to the electrical switch 310. Further, a second end and a third end of the first signal cable bundle 204 (first signal cable bundle 204a and first signal cable bundle 204b, respectively) may each be connected to the switch box 250 (see FIG. 3B).

A first end of the second power cable 302 and a first end of the second signal cable bundle 304 are each connected to the electrical power source 360 and the signal source 350, respectively (see FIG. 1). The second end of the second power cable 302 is connected to the electrical switch 310. Further, the second end and a third end of the second signal cable bundle 304 (second signal cable bundle 304a and second signal cable bundle 304b, respectively) are connected to the switch box 250. The controller 240 is connected to the motion sensor 108, for example, via a wired or a wireless connection, and receives signals from the motion sensor 108 in a case where the motion sensor 108 detects a motion.

The electrical switch 310 is controlled by the controller 240 to electrically connect the second end of the first power cable 202 to the second end of the second power cable 302 in a case where power is to be provided to the display device 102, and to disconnect the second end of the first power cable 202 from the second end of the second power cable 302 in a case where power is not to be provided to the display device 102.

The camera 220 may capture and transmit at least one of still images and videos to the controller 240. Operation of the camera 220 is controlled by the controller 240.

The display control device 200 may be locked or sealed such that access to the contents of the display control device 200, including access to the motion sensor 208, the camera 220, the switch box 250, the electrical switch 310, and connections between the first signal cable bundle 204, the second signal cable bundle 304, the first power cable 202, and the second power cable 302, is restricted or prevented by users who lack appropriate devices, material, permission, or information. For example, the second end of the first power cable 202 may be locked inside the display control device 200 and cannot be tampered with or disconnected from the electrical switch 310. Or the second end of the first power cable 202 may have a non-standard design such that if disconnected from the electrical switch 310, the second end of the first power cable 202 cannot be plugged into a wall outlet.

In a case that the first signal cable bundle 204 is a High-Definition Multimedia Interface (HDMI) cable and only has two ends, the second end of the first signal cable bundle 204 is connected to the switch box 250. In a case that the second signal cable bundle 304 is an HDMI cable and only has two ends, the second end of the second signal cable bundle 304 is connected to the switch box 250. In a case that only one of the first signal cable bundle 204 and the second signal cable bundle 304 is a single end HDMI, the switch box 250 may operate by switching the signal of at the first signal cable bundle 204 or the second signal cable bundle 304 that is not HDMI. In a case that both the first signal cable bundle 204 and the second signal cable bundle 304 are HDMI, the controller 240 controls the switching of the audio and the video signals.

Figures 3B, 3C:
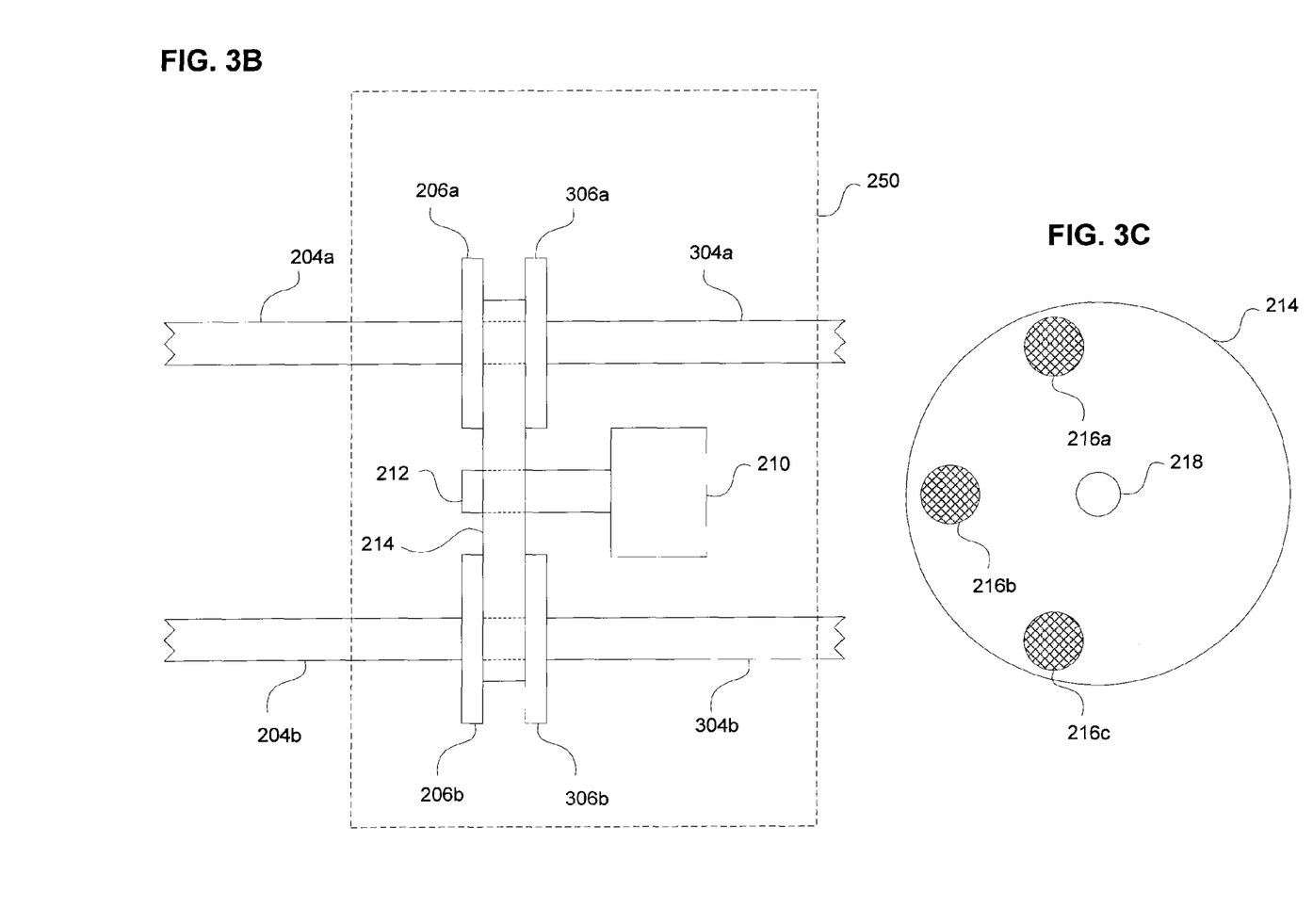
FIG. 3B is a diagram of a switch box in a plan view, according to one example.
FIG. 3C is a diagram of a drum, according to one example.

FIG. 3B is a diagram of the switch box 250 in a plan view, according to one example. The switch box 250 includes the second end of the first signal cable bundle 204a, the third end of the first signal cable bundle 204b, a cable contact 206a, a cable contact 206b, a motor 210, a shaft 212, a drum 214, the second end of the second signal cable bundle 304a, the third end of the second signal cable bundle 304b, a cable contact 306a, and a cable contact 306b.

The motor 210 may be controlled by the controller 240, and the shaft 212 may be fixedly connected to the motor 210. The motor 210 can rotate the shaft 212 in either rotational direction. The drum 214 may be fixedly connected to and centered about the shaft 212, with the drum 214 rotating with the shaft 212.

A first side of the cable contact 306a may be connected to the second end of the second signal cable bundle 304a and a first side of the cable contact 306b may be connected to the third end of the second signal cable bundle 304b. A first side of the cable contact 206a may be connected to the second end of the first signal cable bundle 204a and a first side of the cable contact 206b may be connected to the third end of the first signal cable bundle 204b. A second side of the cable contact 306a and a second side of the cable contact 306b may be connected to a first side of the drum 214. A second side of the cable contact 206a and a second side of the cable contact 206b may be connected to a second side of the drum 214. Thus, signals may be transmitted through the first signal cable bundle 204a and the first signal cable bundle 204b to the cable contact 206a and the cable contact 206b, respectively, and through the second signal cable bundle 304a and the second signal cable bundle 304b to the cable contact 306a and the cable contact 306b, respectively.

The drum 214 may be disposed such that the drum 214 is always simultaneously in contact with the cable contact 206a, the cable contact 306a, the cable contact 206b, and the cable contact 306b, no matter the position of the drum 214.

In another example, the second end of the first signal cable bundle 204a and the third end of the first signal cable bundle 204b may connect to the drum 214 directly without the cable contact 206a and the cable contact 206b, respectively. Further, the second end of the second signal cable bundle 304a and the third end of the second signal cable bundle 304b may be connected to the drum 214 directly without the cable contact 306a and the cable contact 306b, respectively.

FIG. 3C is a diagram of the drum 214, according to one example. The drum 214 includes a first drum contact 216a, a second drum contact 216b, a third drum contact 216c about a center of a diameter of the drum 214, and a cylinder 218 through which the shaft 212 may be disposed to connect the shaft 212 and the drum 214. The drum contact 216a, the drum contact 216b, and the drum contact 216c are disposed such that rotation of the drum 214 about the center of the drum 214 may adjust a combination of the drum contact 216a, the drum contact 216b, and the drum contact 216c that are disposed between and in contact with the cable contact 206a and the cable contact 306a, and disposed between and in contact with the cable contact 206b and the cable contact 306b. If the cable contact 206a and the cable contact 306a are not connected through the drum contact 216a, the drum contact 216b, or the drum contact 216c, signal transmission between the first signal cable bundle 204a and the second signal cable bundle 304a may not occur. If the cable contact 206b and the cable contact 306b are not connected through the drum contact 216a, the drum contact 216b, or the drum contact 216c, signal transmission between the first signal cable bundle 204b and the second signal cable bundle 304b may not occur.

In one case, the motor 210 may rotate the shaft 212 and the drum 214 such that the cable contact 206a is connected to the cable contact 306a by the drum contact 216a and the cable contact 206b is connected to the cable contact 306b by the drum contact 216c. The display device 102 may receive both audio and video signals originating from the signal source 350 and routed through the switch box 250.

In another case, the motor 210 may rotate the shaft 212 and the drum 214 such that the cable contact 206a is connected to the cable contact 306a by the drum contact 216b and neither the drum contact 216a nor the drum contact 216c is positioned between the cable contact 206b and the cable contact 306b. The display device 102 may then receive only one of the audio and video signals originating from the signal source 350 and routed through the switch box 250.

In another case, the motor 210 may rotate the shaft 212 and the drum 214 such that the cable contact 206b is connected to the cable contact 306b by the drum contact 216b and neither the drum contact 216a nor the drum contact 216c is positioned between the cable contact 206a and the cable contact 306a. The display device 102 may then receive only one of the audio and video signals originating from the signal source 350 and routed through the switch box 250.

In another case, the motor 210 may rotate the shaft 212 and the drum 214 such that the cable contact 206a and the cable contact 306a are not connected by the drum contact 216a, the drum contact 216b, or the drum contact 216c, and the cable contact 206b and the cable contact 306b are not connected by the drum contact 216a, the drum contact 216b, or the drum contact 216c. Audio and video signals originating from the signal source 350 are thus not routed to the display device 102 and no signal transmission occurs.

In another example, the first signal cable bundle 204a, the first signal cable bundle 204b, the second signal cable bundle 304a, and the second signal cable bundle 304b are directly connected to the drum 214, the drum contact 216a, the drum contact 216b, and the drum contact 216c. Rotation of the drum 214 about the center of the drum 214 may adjust a combination of the drum contact 216a, the drum contact 216b, and the drum contact 216c that are disposed between and in contact with the first signal cable bundle 204a and the second signal cable bundle 304a, and disposed between and in contact with the first signal cable bundle 204b and the second signal cable bundle 304b. If the first signal cable bundle 204a and the second signal cable bundle 304a are not connected through the drum contact 216a, the drum contact 216b, or the drum contact 216c, signal transmission between the first signal cable bundle 204a and the second signal cable bundle 304a may not occur. If the first signal cable bundle 204b and the second signal cable bundle 304b are not connected through the drum contact 216a, the drum contact 216b, or the drum contact 216c, signal transmission between the first signal cable bundle 204b and the second signal cable bundle 304b may not occur.

Figure 4:
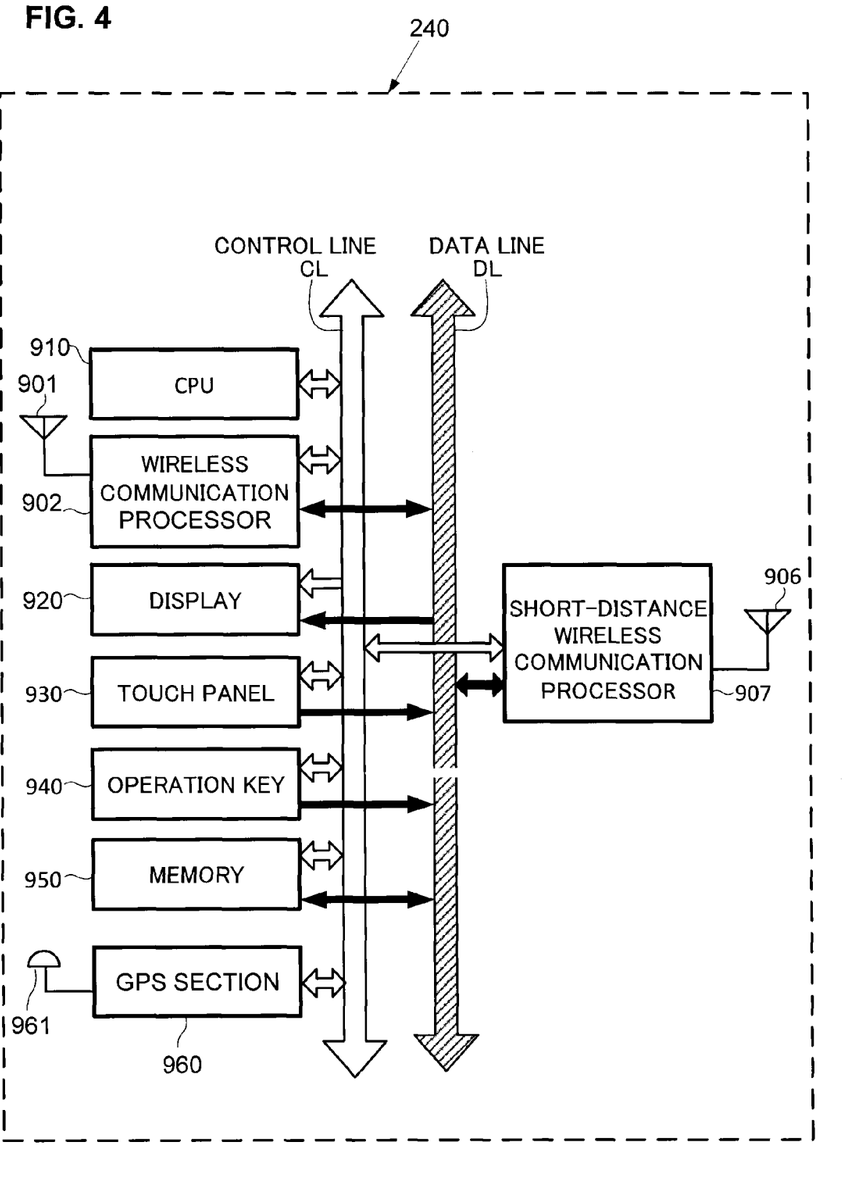
FIG. 4 is a block diagram illustrating a controller, according to one example.

FIG. 4 is a block diagram illustrating the controller 240, according to one example. A skilled artisan will appreciate that the features described herein may be implemented in a variety of devices (e.g., a laptop, a tablet, a server, an e-reader, navigation device, etc.). The controller 240 includes a Central Processing Unit (CPU) 910 and a wireless communication processor 902 connected to an antenna 901.

The CPU 910 may include one or more CPUs, and may control each element in the controller 240 to perform functions related to communication control and other types of signal processing. The CPU 910 may perform these functions by executing instructions stored in a memory 950. Alternatively, or in addition to the local storage of the memory 950, the functions may be executed using instructions stored on an external device accessed on a network or on a non-transitory computer readable medium.

The memory 950 includes but is not limited to Read Only Memory (ROM), Random Access Memory (RAM), or a memory array including a combination of volatile and non-volatile memory units. The memory 950 may be utilized as working memory by the CPU 910 while executing the processes and algorithms of the present disclosure. Additionally, the memory 950 may be used for long-term data storage. The memory 950 may be configured to store, for example, information and lists of commands.

The controller 240 includes a control line CL and data line DL as internal communication bus lines. Control data to/from the CPU 910 may be transmitted through the control line CL. The data line DL may be used for transmission of data.

The antenna 901 transmits/receives electromagnetic wave signals between base stations for performing radio-based communication, such as various forms of cellular telephone communication. The wireless communication processor 902 controls the communication performed between the controller 240 and other external devices via the antenna 901. For example, the wireless communication processor 902 may control communications between base stations for cellular phone communication.

The controller 240 may also include a display 920, a touch panel 930, an operation key 940, and a short-distance communication processor 907 connected to an antenna 906. The display 920 may be a Liquid Crystal Display (LCD), an organic electroluminescence display panel, another display screen technology, or comprise push buttons and visual indicators such as Light Emitting Diodes (LEDs). In addition to displaying still and moving image data, the display 920 may display operational inputs, such as numbers or icons which may be used for controlling the controller 240. The display 920 may additionally display a GUI for a user to control aspects of the controller 240 and/or other devices. Further, the display 920 may display characters and images received by the controller 240 and/or stored in the memory 950 or accessed from an external device on a network. For example, the controller 240 may access a network such as the Internet and display text and/or images transmitted from a Web server.

The touch panel 930 may include both a physical touch panel display screen and a touch panel driver. The touch panel 930 may include one or more touch sensors for detecting an input operation on an operation surface of the touch panel display screen. The touch panel 930 also detects a touch shape and a touch area. As used herein, the phrase "touch operation" refers to an input operation performed by touching an operation surface of the touch panel display with an instruction object, such as a finger, thumb, or stylus-type instrument. In the case where a stylus or the like is used in the touch operation, the stylus may include a conductive material at least at the tip of the stylus such that the sensors included in the touch panel 930 may detect when the stylus approaches/contacts the operation surface of the touch panel display (similar to the case in which a finger is used for the touch operation).

In certain aspects of the present disclosure, the touch panel 930 may be disposed adjacent to the display 920 (e.g., laminated) or may be formed integrally with the display 920. For simplicity, the present disclosure assumes the touch panel 930 is formed integrally with the display 920 and therefore, examples discussed herein may describe touch operations being performed on the surface of the display 920 rather than the touch panel 930. However, a skilled artisan will appreciate that this is not limited as such.

Additionally, for simplicity, the present disclosure assumes the touch panel 930 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 930 may include transparent electrode touch sensors arranged in the X-Y direction on the surface of transparent sensor glass.

The operation key 940 may include one or more buttons or similar external control elements, which may generate an operation signal based on a detected input by the user. In addition to outputs from the touch panel 930, these operation signals may be supplied to the CPU 910 for performing related processing and control. In certain aspects of the present disclosure, the processing and/or functions associated with external buttons and the like may be performed by the CPU 910 in response to an input operation on the touch panel 930 display screen rather than the external button, key, etc. In this way, external buttons on the controller 240 may be eliminated in lieu of performing inputs via touch operations The antenna 906 may transmit/receive electromagnetic wave signals to/from other external apparatuses, and the short-distance wireless communication processor 907 may control the wireless communication performed between the other external apparatuses. Bluetooth, IEEE 802.11, near-field communication (NFC), Radio Frequency (RF), and infrared (IR) are non-limiting examples of wireless communication protocols that may be used for inter-device communication via the short-distance wireless communication processor 907.

The controller 240 may also include a Global Positioning System (GPS) section 960. The GPS section 960 detects the present position of the controller 240. The information of the present position detected by the GPS section 960 is transmitted to the CPU 910. An antenna 961 is connected to the GPS section 960 for receiving and transmitting signals to and from a GPS satellite.

Figure 5:
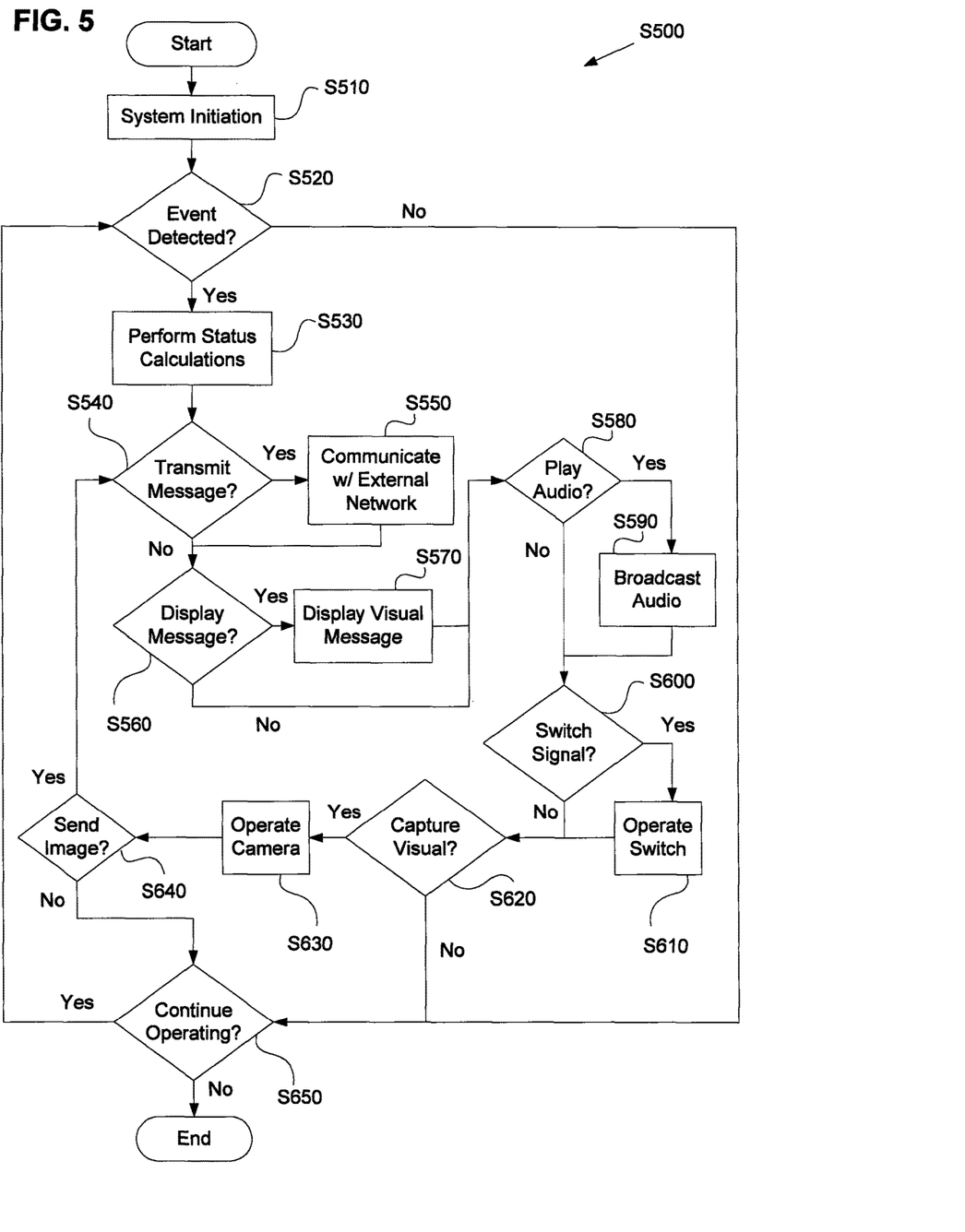
FIG. 5 is a process diagram for operation of the display control device by the controller, according to one example.

FIG. 5 is a process diagram for operation of the display control device 200 by the controller 240, according to one example. The process diagram includes a sequence of primary processes of a display device control method S500 for the display control device 200. The process diagram may encompass various operations of the controller 240 and system examples and embodiments described by FIG. 1 through FIG. 4. The display control method S500 includes, in this example, an initiating process S510, a calculating process S530, a communicating process S550, a displaying process S570, a broadcasting process S590, a switching process S610, a recording process S630, and various decision points described herein.

S510 represents a process of initiating operation of the display control device 200 upon start up. The process may include verifying the presence and proper operation of each system component, such as that of the display device 102, the display screen 104, the audio device 106, the motion sensor 208, the camera 220, the controller 240 (for example through a self-diagnostic test), the switch box 250, the electrical switch 310, and various subsystems as may be applicable. The controller 240 then proceeds to process S520.

S520 represents a decision point of whether an event that has been detected requires further action by the controller 240. If an event is detected by S520 the controller 240 proceeds to process S530, otherwise the controller 240 proceeds to process S650. Events may include, but are not limited to, a motion being sensed by the motion sensor 108 or the motion sensor 208 within the sensing range, a message is received, a condition has been met, a limit has been reached, or a time period has elapsed. Messages or codes received from external sources, such as from a smart phone, tablet, or desktop computer, may be received through the wireless communication processor 902 or the short-distance wireless communication processor 907 of the controller 240 for the purpose of controlling the use of the display device control system 101. Further, the controller 240 may control operations of the display device 102 through the remote display device controller 160, such as by using the short-distance communication processor 907 to transmit and receive signals from with the remote display device controller 160.

In another example, a user may wish to check on the use of the display device 102 by a another, for example, a parent checking on the usage by a child, and may do so by sending a request from a remote device to the wireless communication processor 902 of the controller 240 to activate the camera 220 and obtain still images or video of a room where the display device control system 101 is disposed. Further, a user may check a status or use of the display device control system 101 by accessing the memory 950 to review activity of the display device control system 101.

S530 represents a process of calculating if a limit has been reached. The controller 240 determines if the event detected in process S530 may be counted, compares the counts to preset limits, and determines if values or limits have been reached or limits exceeded. In one example, if there is a limit to the number of times motion may be sensed by the motion sensor 108 or the motion sensor 208 within the sensing range, the controller 240 may perform an action described in at least one of the following processes. Further, the controller 240 may determine for how long an action may be performed. The controller 240 then proceeds to process S540.

S540 represents a process of deciding whether to transmit a message according to preset criteria. If a message is to be transmitted then the controller 240 proceeds to process S550, otherwise the controller 240 proceeds to process S560.

S550 represents a process of communicating with external networks or devices. Communications may include sending alerts or messages related to the status of information displayed on the display device 102, such as programming information, actual content displayed on the display device 102 in real time, or periodic snap shots of the content displayed on the display device 102. Messages, for example, emails or text messages, may also include information related to penalties, limits, or counts tracked by the display control device 200. Further, communications may include sending images or videos recorded or captured by the camera 220 during process S630 to one or more external devices, for example via WiFi or cellular communication.

In another example, external devices, such as smart phones, tablet computers, or desktop computers, may be used to respond to and communicate with the display device control system 101 by using video or audio capability of the display device control system 101. Users may be able to see or hear each other when the display device control system 101 is operating in a unidirectional or bidirectional communication mode. The communication mode may be triggered by events, as determined during process S520.

In another example, the controller 240 may be connected with other networks or systems, such as smart home alarms, to provide additional security. In one case, by interacting with the display control device 200, such as through voice activation or depressing one or more pushbuttons on the controller 240, a user may contact emergency services such as 911 or e911 directly via Wi-Fi or a cellular network, or with a connection through a smart home alarm system.

In another example, the controller 240 may be configured to communicate with external devices or networks to prevent or restrict use of the external devices. For example, if a child reaches a time limit for watching the display device 102 or accumulates more than a number of occurrences of an action, the controller 240 may communicate with the child's smart phone to limit use of the smart phone. Upon completion of process S550, the controller 240 then proceeds to process S560.

S560 represents a process of deciding whether to display a message according to preset criteria. If a message is to be displayed the controller 240 proceeds to process S570, otherwise the controller 240 proceeds to process S580.

S570 represents a process of displaying images on the display screen 104. Images may be still images, dynamic messages, or videos, and may be preset to particular messages. Messages may include instructions and system or user status as determined during process S530, such as current limits, limits exceeded, a time countdown until full use of the display device 102 will be permitted, or other preset images, animations, or videos. In one example, the display screen displays a message "Please step back from the screen". Other displays of visual messages may encompass, for example, different text messages, or flashing or blinking of sequences of indicator lights on the display control device 200. The controller 240 then proceeds to process S580.

S580 represents a process of deciding whether to broadcast an audio message according to preset criteria. If an audio message is to be broadcast the controller 240 proceeds to process S590, otherwise the controller 240 proceeds to process S600.

S590 represents a process of broadcasting an audio message through the audio device 106 or through another device connected to the controller 240 via an external network or connection, for example a smart phone, tablet, or desktop computer. Audio messages may include preset sounds, spoken messages, or prerecorded messages created by users of the display device control system 101. Audio messages may be stored in the memory 950 or reside on an external network and are accessed by the wireless communication processor 902, and the controller 240 may be preset to play particular sounds or recordings. Messages may include instructions and system or user status as determined during process S530, such as announcing current limits, that limits are exceeded, a time countdown until full use of the display device 102 will be permitted, or other preset chimes, sounds, or music. Audio messages may also encompass, for example, notes or reminders of system status. The controller 240 then proceeds to process S600.

S600 represents a process of deciding whether to switch at least one of an audio signal and a video signal according to preset criteria. If a signal is to be switched the controller 240 proceeds to process S610, otherwise the controller 240 proceeds to process S620.

S610 represents a process of switching between the controller 240 operating in a mode of providing a video signal to the display screen 104 and an audio signal to the audio device 106, to a mode of providing only a video signal to the display screen 104, a mode of providing only an audio signal to the audio device 106, or a mode of not providing either audio or video signals to the display device 102. The controller 240 may do so by operating the motor 210 to rotate the drum 214 to the first, the second, the third, or the fourth position. Alternatively, the controller 240 may direct the electrical switch 310 to disconnect electrical power to the display device 102 for at least a finite period of time. Upon completion of process S610, the controller 240 then proceeds to process S620.

S620 represents a process of deciding whether to capture a visual image. If a visual image is to be captured the controller 240 proceeds to process S630, otherwise the controller 240 proceeds to process S650.

S630 represents a process of recording still images or video. This process may be accomplished using the camera 220, where the camera 220 records images or videos to the memory 950, or streams to an external network or device for a period of time, such as by process S640. The controller 240 then proceeds to process S640.

S640 represents a process of deciding whether to send an image stream or video according to preset criteria. If an image or video stream is to be sent the controller 240 proceeds to process S540, otherwise the controller 240 proceeds to process S650.

S650 represents a process of deciding whether to continue operating the display control device 200 according to preset criteria. If operations are to be continued the controller 240 proceeds to process S520, otherwise the controller 240 proceeds to end operation of display device control method S500.

Thus, the foregoing discussion discloses and describes merely exemplary embodiments of the present application. As will be understood by those skilled in the art, the present application may be embodied in other specific forms without departing from the spirit or essential characteristics thereof. Accordingly, the disclosure of the present application is intended to be illustrative, but not limiting of the scope of the application, as well as other claims. The disclosure, including any readily discernable variants of the teachings herein, defines, in part, the scope of the foregoing claim terminology such that no inventive subject matter is dedicated to the public.

What is claimed is:

1. A system for controlling a display device, the system comprising:
   a display control device;
   an electrical switch disposed within the display control device;
   a first power cable, having a first end and a second end, the first end of the first power cable connected to the display device and the second end of the first power cable connected to the electrical switch;
   a second power cable, having a first end and a second end, the first end of the second power cable connected to the electrical power source and the second end of the second power cable connected to the electrical switch; and
   a motion sensor connected to the display control device, wherein the motion sensor senses a motion and provides the sensed motion as an input to the display control device, and
   wherein the display control device controls the electrical switch and controls a supply of power to the display device,
   a signal source, the signal source having at least one of audio and video signals;
   a switchbox connected to the display control device;
   a first signal cable bundle having a first, a second end, and a third end, the first end of the first signal cable bundle connected to the display device, the second end and the third end of the first signal cable bundle connected to the switchbox; and
   a second signal cable bundle having a first end, a second end, and a third end, the first end of the second signal cable bundle connected to the signal source and the second end and the third end of the second signal cable bundle connected to the switchbox;
   wherein the display control device operates the switchbox to control a transmission of at least one of the audio and video signals received by the display device,
   wherein the switchbox further comprises:
   a motor;
   a shaft rotatably connected to the motor; and
   a drum fixedly connected to the shaft, the drum having a first drum contact, a second drum contact, and a third drum contact disposed about a center of the drum,
   wherein a first side of the drum is in contact with the second end and a third end of the second signal cable bundle, and a second side of the drum is in contact with the second end and a third end of the first signal cable bundle, and
   wherein rotation of the drum to a fixed position by the motor results in a maximum of two connections between the display device and the signal source.

2. The system according to claim 1, wherein the display control device further comprises:
   a controller;
   a memory; and
   a wireless communication processing section,
   wherein the controller communicates with an external network to transmit and receive information.

3. The system according to claim 2, further comprising:
   an audio device connected to the controller,
   wherein the display control device broadcasts audio messages through the audio device.

4. The system according to claim 2, further comprising:
   a camera connected to the controller,
   wherein the controller records to the memory at least one of images and videos.

5. The system according to claim 2, further comprising:
   a camera connected to the controller,
   wherein the controller transmits to an external network at least one of images and videos captured by the camera.

6. The system according to claim 1, wherein the display control device switches between displaying an output of the video signal and displaying other images on the display device.

7. The system according to claim 1, wherein the display control device controls the display device by communicating with a remote display device controller.

* * * * *